US012723724B2

(12) United States Patent
Philipp

(10) Patent No.: US 12,723,724 B2
(45) Date of Patent: Sep. 1, 2026

(54) LAMP WITH STEERABLE BEAM

(71) Applicant: GM GLOBAL TECHNOLOGY OPERATIONS LLC, Detroit, MI (US)

(72) Inventor: Tzvi Philipp, Bet Shemesh (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 135 days.

(21) Appl. No.: 18/425,612

(22) Filed: Jan. 29, 2024

(65) Prior Publication Data

US 2025/0243984 A1 Jul. 31, 2025

(51) Int. Cl.

| | |
|---|---|
| ***F21S 41/64*** | (2018.01) |
| ***F21S 41/125*** | (2018.01) |
| ***F21S 41/16*** | (2018.01) |
| ***F21S 41/20*** | (2018.01) |
| *F21Y 101/00* | (2016.01) |

(52) U.S. Cl.

CPC ............ *F21S 41/64* (2018.01); *F21S 41/125* (2018.01); *F21S 41/16* (2018.01); *F21S 41/285* (2018.01); *F21Y 2101/00* (2013.01)

(58) Field of Classification Search

CPC .. F21S 41/16; F21S 41/25; F21S 41/60; F21S 41/64; F21S 41/20; F21V 9/30; F21W 2102/00

See application file for complete search history.

(56) References Cited

U.S. PATENT DOCUMENTS

| | | | |
|---|---|---|---|
| 11,054,715 B2 * | 7/2021 | Koyama | G02F 1/29 |
| 2011/0249460 A1 * | 10/2011 | Kushimoto | F21S 41/141 362/509 |
| 2014/0029282 A1 | 1/2014 | Ravier et al. | |
| 2016/0195232 A1 | 7/2016 | Boinet | |
| 2022/0026539 A1 | 1/2022 | Bernier et al. | |

FOREIGN PATENT DOCUMENTS

| | | |
|---|---|---|
| DE | 102010055128 A1 | 7/2011 |
| DE | 102013226624 A1 | 6/2015 |
| DE | 102014217521 A1 | 3/2016 |
| DE | 102014224572 A1 | 6/2016 |
| KR | 20110057834 A | 6/2011 |
| WO | WO-2022155612 A1 | 7/2022 |

OTHER PUBLICATIONS

German Office Action from counterpart DE1020241116692, dated Dec. 17, 2024.

U.S. Appl. No. 18/492,286, filed Oct. 23, 2023, Philipp et al.

* cited by examiner

*Primary Examiner* — William J Carter

(57) ABSTRACT

A lamp with a steerable beam, suitable for use as a vehicle headlight, includes a phosphor converter that emits white light from a location impinged by light from a laser, and at least one projection lens for transmitting the white light emitted from the phosphor converter in as a beam in a direction dependent on the location of emission from the phosphor converter. There is at least one high intensity laser; and at least one multi-stage, bi-axial liquid crystal polarization grating for directing laser light from the at least one high intensity laser to a selectable location on the phosphor converter to change the direction of the beam emitted from the light.

20 Claims, 6 Drawing Sheets

LAMP WITH STEERABLE BEAM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to steerable lamps, and in particular to a solid-state steerable lamp, useful has a headlight.

Adaptive headlights are headlights that actively respond to changing conditions, providing drivers with better visibility and more time to react to the changing conditions ahead. Adaptive headlights are typically implemented in one of two ways: First, a mechanism can be provided to physically manipulate the light source. Second, multiple lights sources can be provided within the headlight. Both solutions result in larger headlight assemblies, and additional cost. The mechanical solutions also involve the added expense of maintaining the headlight, and an increased opportunity for failure.

SUMMARY

A first embodiment of this disclosure provides a lamp with a steerable beam useful in applications such as headlights, and in particular as adaptive headlights. The lamp can comprise a phosphor converter, such as a ceramic phosphor converter, which emits white light from a location impinged by light from a source, such as a laser, and at least one projection lens for transmitting the white light emitted from the phosphor converter as a beam in a direction dependent on the location of emission from the phosphor converter. The lamp can also comprise at least one light source such as a high intensity laser or micro-LED, generally directed at the phosphor converter, and at least one multi-stage, bi-axial liquid crystal polarization grating for directing the laser light from the at least one high intensity laser to a selectable location on the phosphor converter.

The at least one high intensity light source can be of a blue or a purple wave length, between about 400 and 500 nm. In some versions of this first embodiment, at least one of the at least high intensity light source is a laser that can be pulsed, for example to prevent the laser and the phosphor converter from overheating.

At least some versions of the second embodiment can provide a solid-state light with no moving parts.

In some versions of the first embodiment there are a plurality of high intensity lasers, and a multi-stage, bi-axial liquid crystal polarization grating for each high intensity laser for directing light from its respective high intensity laser to a selectable location on the phosphor converter. Some of the high intensity lasers can operate through the same multi-stage, bi-axial liquid crystal polarization grating, or each high intensity laser can have its own multi-stage, bi-axial liquid crystal polarization grating.

In other versions of the first embodiment, there is at least one high intensity laser without a corresponding multi-stage, bi-axial liquid crystal polarization grating, directed to a fixed location on the phosphor converter and at least one high intensity laser with a multi-stage, bi-axial liquid crystal polarization grating for directing the laser light from its respective laser. This can provide a beam with a fixed component and a variable component.

In some versions of the first embodiment, the lamp has a controller including at least one microprocessor programmed to receive location data and operate the multi-stage, bi-axial liquid crystal polarization grating to direct the beam in a direction toward the location corresponding to the location data. In some versions of the first embodiment, there are a plurality of high intensity lasers, and a multi-stage, bi-axial liquid crystal polarization grating for each high intensity laser for directing light from its respective high intensity laser to a selectable location on the phosphor converter, and there is a controller including at least one microprocessor programmed to selectively operate the multi-stage, bi-axial liquid crystal polarization gratings to direct the beams of at least two of the high intensity lasers to the same location on the phosphor converter.

According to a second embodiment of this disclosure a vehicle is provided with at least one headlight with a steerable beam, such as a light according to the first embodiment. The headlight can comprise a phosphor converter that emits white light from a location impinged by light from a laser, and at least one projection lens for transmitting the white light emitted from the phosphor converter in as a beam in a direction dependent on the location of emission from the phosphor converter. The lamp further comprises at least one high intensity light source such as a laser; and at least one multi-stage, bi-axial liquid crystal polarization grating for directing laser light from the at least one high intensity laser to a selectable location on the phosphor converter.

The headlight can further comprise a controller including at least one microprocessor programmed to receive location data from the vehicle and operate the multi-stage, bi-axial liquid crystal polarization grating to direct the laser light to a location on phosphor converter that will create a beam in a direction toward the location corresponding to the location data.

In some versions of the second embodiment, there are at least two high intensity lasers, and a multi-stage, bi-axial liquid crystal polarization grating for each high intensity laser for directing light from its respective high intensity laser to a selectable location on the phosphor converter, and the lamp further comprises a controller including at least one microprocessor programmed to selectively operate the multi-stage, bi-axial liquid crystal polarization gratings to direct the beams of at least two of the high intensity lasers to the same location on the phosphor converter.

In some versions of the second embodiment the lamp further comprises a controller including at least one microprocessor programmed to receive speed data from the vehicle and operate the multi-stage, bi-axial liquid crystal polarization grating change the location that the laser light impinges on the phosphor converter with a change in speed to change the direction of the beam in a predetermined manner with a change in speed.

In some versions of the second embodiment the lamp further comprises a controller including at least one microprocessor programmed to receive turn signal data and operate the multi-stage, bi-axial liquid crystal polarization grating change the location that the laser light impinges on the phosphor converter upon operation of the vehicle turn signal to change the direction of the beam in a predetermined manner. In some versions of the second embodiment the lamp further comprises a controller including at least one microprocessor programmed to receive turning data and operate the multi-stage, bi-axial liquid crystal polarization grating change the location that the laser light impinges on the phosphor converter upon turning of the vehicle to change the direction of the beam in a predetermined manner.

In still another version of the second embodiment the vehicle has at least one of a lidar, optical, radar, or ultrasound imaging system, and wherein the lamp further comprises a controller including at least one microprocessor programmed to receive data from the imaging system of the vehicle and operate the multi-stage, bi-axial liquid crystal polarization grating change the location that the laser light impinges on the phosphor converter to change the direction of the beam in a predetermined manner.

In this second embodiment, and all of its versions, the at least one high intensity laser is of a blue or a purple with a wavelength between about 400 and about 500 nanometers. Similarly, in this second embodiment, and all of its versions, the at least one high intensity laser can be pulsed, to reduce heating of the laser and of the phosphor converter.

In this second embodiment, and all of its versions, the lamp can include at least one high intensity laser without a corresponding multi-stage, bi-axial liquid crystal polarization grating, in addition to at least one high intensity laser with a multi-stage, bi-axial liquid crystal polarization grating.

According to a third embodiment of this disclosure, a method of changing the direction of the beam of a headlight on a vehicle having a high intensity laser source, a phosphor converter that emits white light from a location impinged by light from a laser, and at least one projection lens for transmitting the white light emitted from the phosphor converter in as a beam in a direction dependent on the location of emission from the phosphor converter, is provided. The method comprises operating a multi-stage, bi-axial liquid crystal polarization grating to change the location where the light from the high intensity laser source impinges on the phosphor converter to thereby change the direction of the beam.

According to one version of the third embodiment, the laser source can be pulsed to reduce heating of the high intensity light source and the phosphor converter. According to another version of the third embodiment, the multi-stage, bi-axial liquid crystal polarization grating to change the location where the laser impinges on the phosphor converter to thereby change the direction of the beam, in response to changes in speed and/or direction of the vehicle.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 4 is a schematic diagram of a light with a steerable beam according to the principles of a third alternate version of the first embodiment of this disclosure, with a controller;

In the drawings, reference numbers may be reused to identify similar and/or identical elements.

DETAILED DESCRIPTION

Figure 1:
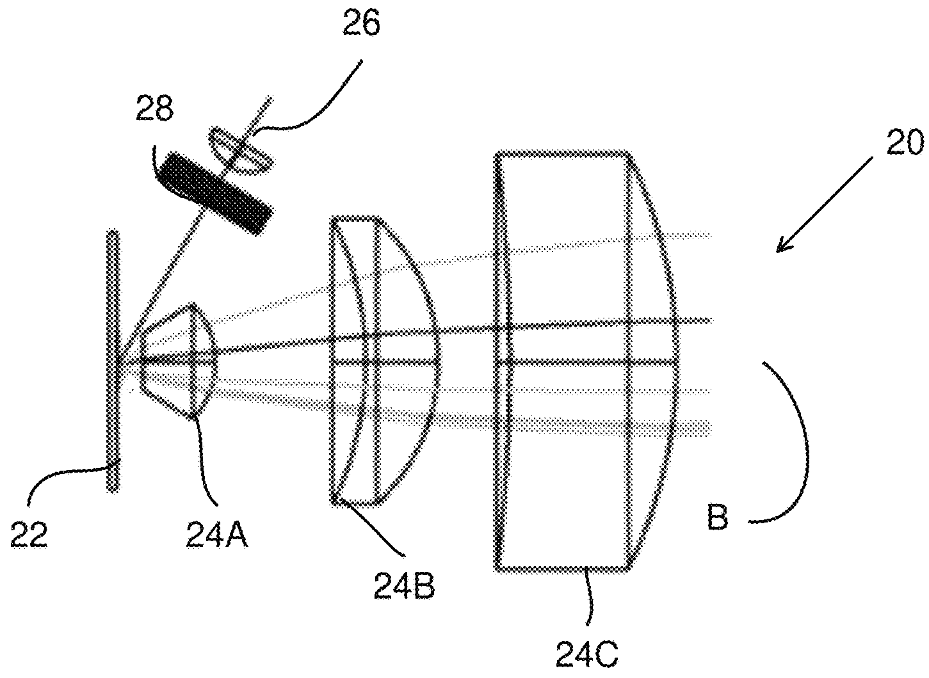
FIG. 1 is a schematic diagram of a light with a steerable beam according to the principles of a first embodiment of this disclosure.

A lamp with a steerable beam according to a first embodiment of this disclosure is indicated generally as 20 in FIG. 1. Lamp 20 with its steerable beam is useful in applications such as headlights, and in particular adaptive headlights.

The lamp 20 can comprise a phosphor converter 22 that emits white light from a location impinged by light from a high intensity source, such as a laser. The phosphor converter 22 can be a ceramic laser phosphor converter available from SCHOTT North America, Inc. Rye Brook, New York, USA. The phosphor converter 22 can be a substantially flat, rectangular panel, but could have some other shape, for example convex or concave. In some embodiments this phosphor converter can be as small as about 25 mm by about 50 mm, leading to a very compact light design. The phosphor converter 22 can have a heatsink (not shown) for dissipating energy from one or more lasers directed at the phosphor converter.

The lamp 20 can also comprise at least one projection lens 24 for transmitting the white light emitted from the phosphor converter 22 as a beam B in a direction dependent on the location of emission from the phosphor converter. As shown in FIG. 1 there are three lenses 24A, 24B, and 24C, but there can be fewer or more lenses, if desired. In this first embodiment, the projection lenses are small to facilitate a compact light design, with a large collection angle, and minimal chromatic dispersion. Of course, where size is not important the lenses could be larger. The projection lens 24 should not interfere with the illumination beam from laser over all of its designed steering angles. The projection lens also should not create back reflections that could cause secondary excitations on the phosphor that would generate “ghost” illumination beams.

The lamp 20 can also comprise at least one high intensity light source 26, such as a laser or micro-LED, generally directed generally toward the center of the phosphor converter 22. In this first embodiment the high intensity light source is high intensity laser 26. The high intensity laser 26 can have at least 1 Watt of optical power.

At least one multi-stage, bi-axial liquid crystal polarization grating 28 is provided, with one multi-stage, bi-axial liquid crystal polarization grating disposed between each high intensity laser 26 and the phosphor convertor 22 for directing the laser light from the at least one high intensity laser to a selectable location on the phosphor converter. A multi-stage, bi-axial liquid crystal polarization grating is a diffractive optical element that modulates the polarization states or Pancharatnam-Berry (PB) phases of light by spatially changing the anisotropy parameters across the plane of the elements in a periodic way. Such devices are available from a variety of sources, including Meadowlark Optics, Frederick, Colorado, and other sources.

Figure 7:
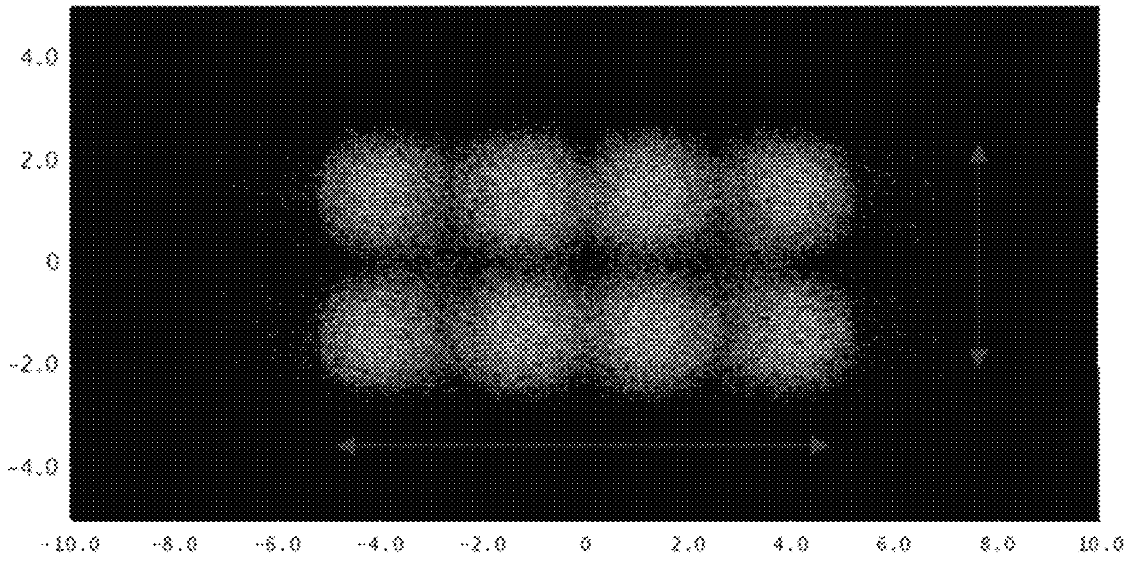
FIG. 7 is a diagram showing a possible layout of illumination positions of the of the phosphor.

The multi-stage, bi-axial liquid crystal polarization grating has two or more stages to facilitate redirecting light from the high intensity lasers 26 in more than one direction. For example, the multi-stage, bi-axial liquid crystal polarization gratings can direct the beam laterally across the width of the phosphor converter 22, and vertically across the height of the phosphor converter. As shown in FIG. 7, a multi-stage, bi-axial liquid crystal polarization gratings could redirect the light from a laser 26 to a plurality of discrete locations (eight as shown in FIG. 7) on the phosphor converter 22, each resulting in a beam or portion of a beam in a different direction. FIG. 7 is exemplary only, and there could be as few as two discrete locations, and as many as 16 or 32 discrete locations, or more, The at least one high intensity laser 26 can be of a blue or a purple wavelength, between about 400 and about 500 nm, and in some alternatives of this first embodiment, between about 400 and about 450 nm. In some versions of this first embodiment at least one of the at least high intensity lasers 26 can be pulsed to create a pulsed emission from the phosphor converter 22, to reducing heating of the laser's sources and the phosphor converter. The pulse rate is advantageously at least 30 Hz so that it does not result in a flickering beam, and can be between about two kHz to about one MHz, depending upon the laser driver and the voltage source for the laser.

Figure 2:
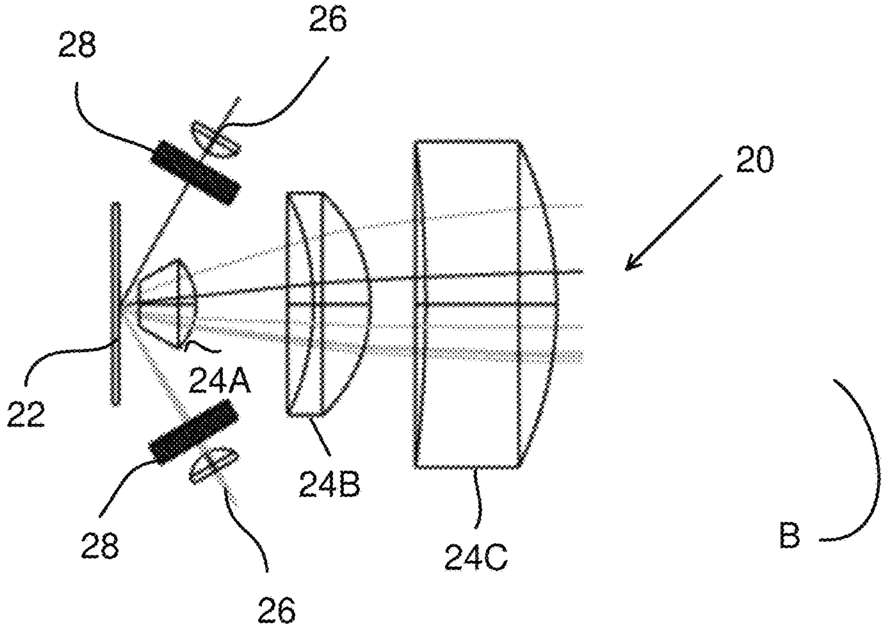
FIG. 2 is a schematic diagram of a light with a steerable beam according to the principles of a first alternate version of the first embodiment of this disclosure, with two high intensity light sources.
Figure 3:
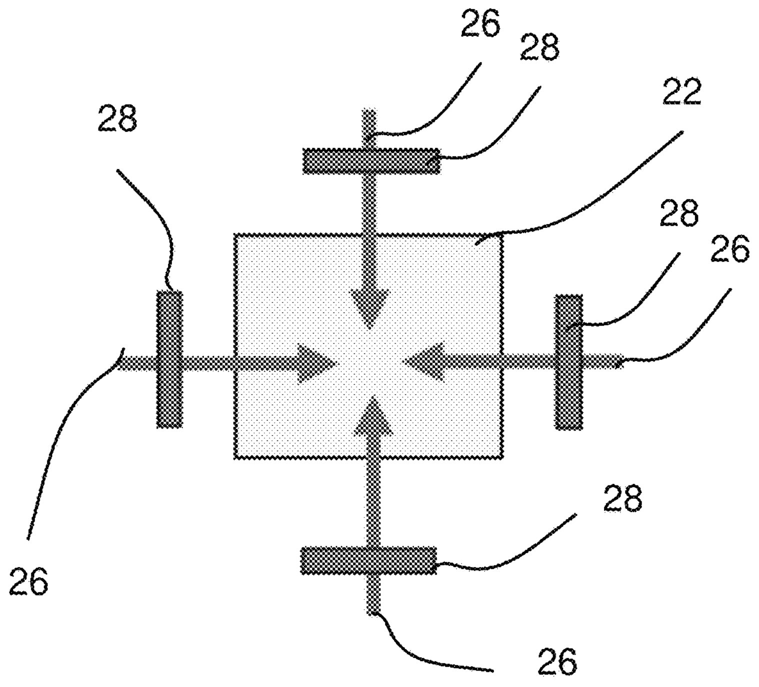
FIG. 3 is a schematic diagram of a portion of a light with a steerable beam according to the principles of a first alternate version of the first embodiment of this disclosure, showing the arrangement of four high intensity light sources around a phosphor converter.
Figure 4:
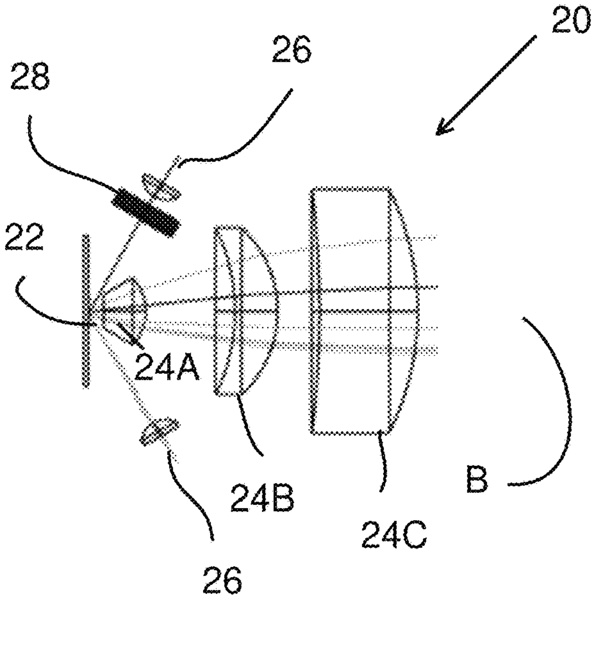
FIG. 4 is a schematic diagram of a light with a steerable beam according to the principles of a second alternate version of the first embodiment of this disclosure, showing one fixed and one variable light source.

In a first alternate version of the first embodiment shown in FIG. 2, there are a plurality of high intensity lasers 26 (two as shown in FIG. 2), with a multi-stage, bi-axial liquid crystal polarization grating 28 for redirecting light from each of the high intensity laser(s) to a selectable location on the phosphor converter 22. FIG. 4 shows how four high intensity lasers might be arranged around a phosphor converter 22, to create as many as four separate variable components to beam B. The high intensity lasers 26 can share multi-stage, bi-axial liquid crystal polarization gratings 28, or each high intensity laser 26 can have its own multi-stage, bi-axial liquid crystal polarization grating. The first alternate version allows for a beam B in with components in two different directions, and if multiple lasers are focused at or near the same location on the phosphor converter 22, the intensity of the beam B in the direction corresponding to that location can be increased.

In a second alternate version of the first embodiment shown in FIG. 4, there is at least one high intensity laser 26 without a corresponding multi-stage, bi-axial liquid crystal polarization grating 28, directed to a fixed location on the phosphor converter 22 and at least one high intensity laser with a multi-stage, bi-axial liquid crystal polarization grating for directing the laser light from its respective laser to a selectable location on the phosphor converter. The second alternate version allows for at least one fixed portion or component of beam B, and one (or more) variable portions or components of beam B directed in selectable directions determined by where on the phosphor converter 22 the multi-stage, bi-axial liquid crystal polarization gratings 28 direct the light from their respective high intensity lasers 26.

Figure 5:
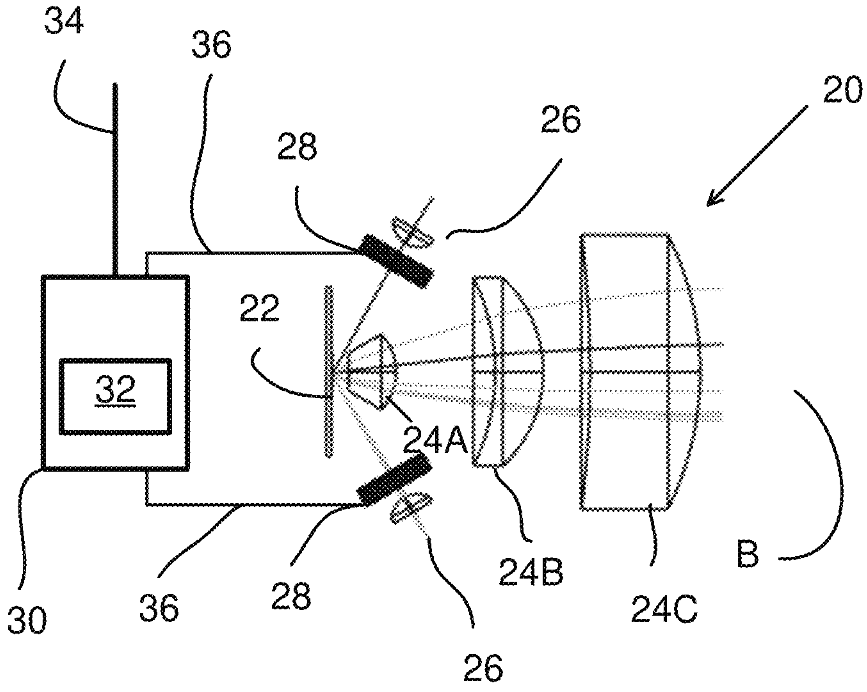
FIG. 5 is a schematic diagram of a light with a steerable beam according to the principles of a fourth alternate version of the first embodiment of this disclosure, with a controller.
Figure 6:
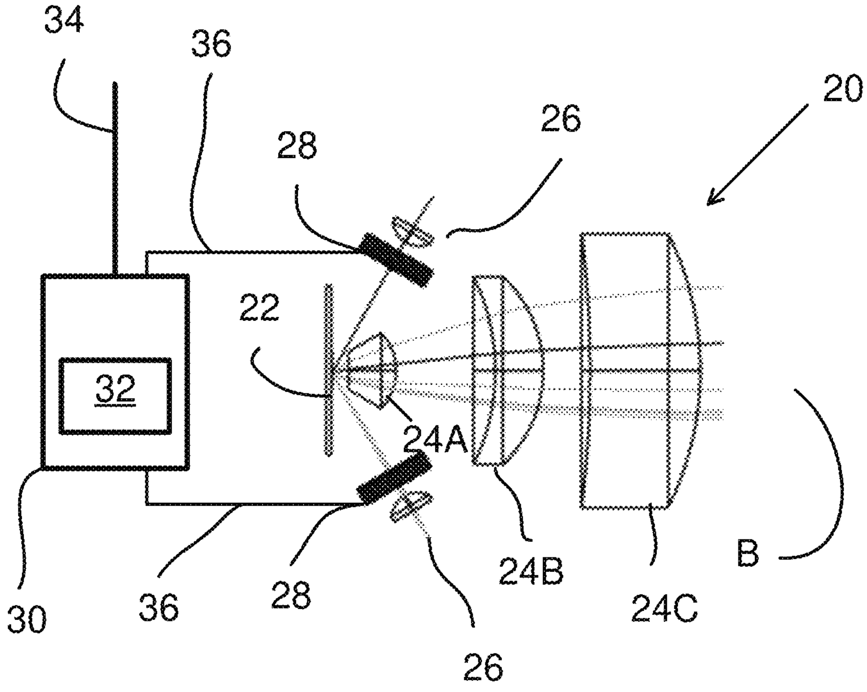
FIG. 6 is a schematic diagram of a light with a steerable beam according to the principles of a fifth alternate version of the first embodiment of this disclosure, with a controller.

In a third alternate version of the first embodiment shown in FIG. 5, the lamp 20 has a controller 30 including at least one microprocessor 32 that collectively are programmed to receive location data on input 34 and operate one or more of the multi-stage, bi-axial liquid crystal polarization gratings 28 via outputs 36 to direct laser light from the one or more high intensity lasers to the appropriate selected location on the phosphor converter 22 to direct the beam B in a direction toward the location corresponding to the location data. This allows the lamp 20 to direct beam B or at least a portion of beam B to a particular location. For example, in the case where the lamp 20 is used as a headlight on a vehicle, all or a portion of beam B can be directed to a location of interest identified by the vehicle's lidar, optical, radar, or ultrasound imaging system, to a location where the vehicle is heading, or toward a location selected by a user.

For example, the field of view captured by imaging sensor can be mapped to the headlight protection area, for example by subdividing the field of view into regions that correspond 1:1 with a possible direction of all or a portion of a beam B, which in turn depends on illuminating a particular location on the phosphor converter 22, e.g. one of the eight positions illustrated in FIG. 7. Thus, physical locations, and beam directions to illuminate a particular locations, can be mapped to a particular set of voltages that cause the multi-stage, bi-axial liquid crystal polarization grating illuminate the corresponding locations on the phosphor converter. Objects of interest in the field of view of the image sensor are identified, and the unique set of corresponding voltage values to cause the appropriate multi-stage, bi-axial liquid crystal polarization gratings to steer the light from the high intensity laser sources to the corresponding location on the phosphor converter that cause the beam (or portion of the beam) to project in the desired direction.

The particular voltages can be determined via a calibration process during the manufacturing of the device. Each device has a set of voltages defined in a LUT (look up table) that maps to the desired subregion of the field of view of the imaging system. An algorithm can determine whether to illuminate the object of interest, based at least in part on one or more of (a) the object type (e.g., a car or pedestrian); (b) the location of the object (e.g., at a curb, on a sidewalk, or on a street); and (c) visibility (whether the object can be identified). Of course, other criteria could be used in addition to, or instead of, these criteria. If the object is to be illuminated, the subregion of the field of view is identified, and the appropriate multi-stage, bi-axial liquid crystal polarization gratings are operated to direct light to the identified subregion, and the corresponding light sources are activated.

In a fourth alternate version of the first embodiment shown in FIG. 5, there are a plurality of high intensity lasers 26, and a multi-stage, bi-axial liquid crystal polarization grating 28 for each high intensity laser for directing light from its respective high intensity laser to a selectable location on the phosphor converter 22. There is also a controller 30 with input 34 and outputs 36, and including at least one microprocessor 32 collectively programmed to selectively operate the multi-stage, bi-axial liquid crystal polarization gratings to direct the beams of at least two of the high intensity lasers to the same or closely adjacent locations on the phosphor converter 22. This creates a higher intensity beam B, than a beam created by a single high intensity laser.

Figure 8:
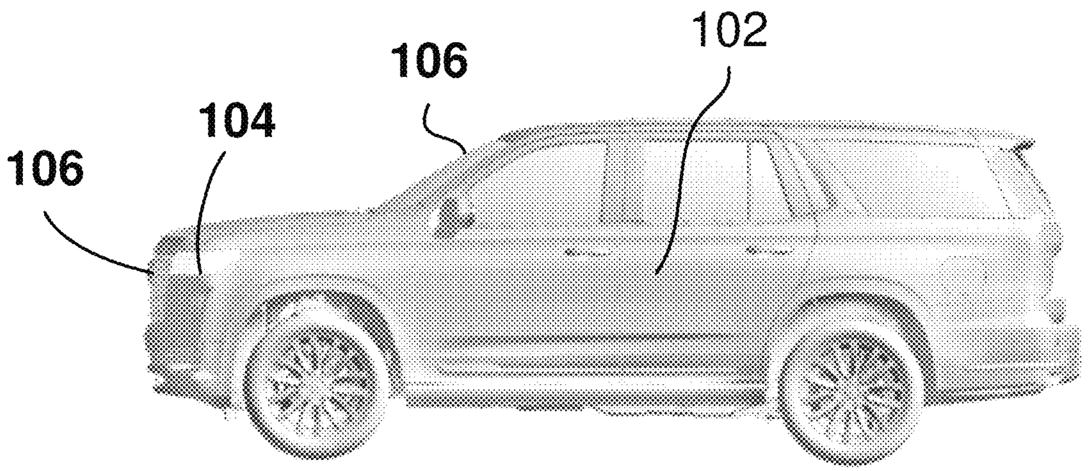
FIG. 8 is a schematic diagram of a vehicle with a headlight with a steerable beam according to the principles of a second embodiment of this disclosure.

According to a second embodiment of this disclosure shown in FIG. 8, a vehicle 102 is provided with at least one headlight 104 with a wholly or partially steerable beam. The headlight 104 can comprise the lamp 20, shown and described above, with a phosphor converter 22 that emits white light from a location impinged by light from a high intensity light such as a laser, and at least one projection lens 24 for transmitting the white light emitted from the phosphor converter as a beam B in a direction dependent on the location of the emission from the phosphor converter.

The headlight 104 further comprises at least one high intensity light source, such as high intensity laser 26; and at least one multi-stage, bi-axial liquid crystal polarization grating 28 for directing laser light from the at least one high intensity laser to a selectable location on the phosphor converter 22.

As also described above, the headlight 104 can further comprises a controller 30 including input 34 and one or more outputs 36, and at least one microprocessor collectively programmed to receive location data from the vehicle 102 via the input 34 and operate the multi-stage, bi-axial liquid crystal polarization gratings 28 via outputs 36 to direct the laser light from the high intensity lasers 26 to a location on phosphor converter 22 that will create a beam B in a direction toward the location corresponding to the location data provided to the controller.

In a first alternate version of this second embodiment, the headlight 104 can include at least at least two high intensity lasers 26, and a multi-stage, bi-axial liquid crystal polarization grating 28 for each high intensity laser for directing light from its respective high intensity laser to a selectable location on the phosphor converter 22. Two or more high intensity lasers 26 can share a multi-stage, bi-axial liquid crystal polarization grating 28, or each high intensity laser 26 can be provided with its own a multi-stage, bi-axial liquid crystal polarization grating. The headlight 104 further comprises a controller 30 with an input 34 and outputs 36 including at least one microprocessor 22 programmed to selectively operate the multi-stage, bi-axial liquid crystal polarization gratings to direct the beams of at least two of the high intensity lasers to the same location on the phosphor converter 22. This can increase the intensity of the emission from the phosphor converter, and of the resulting beam B.

Figure 9:
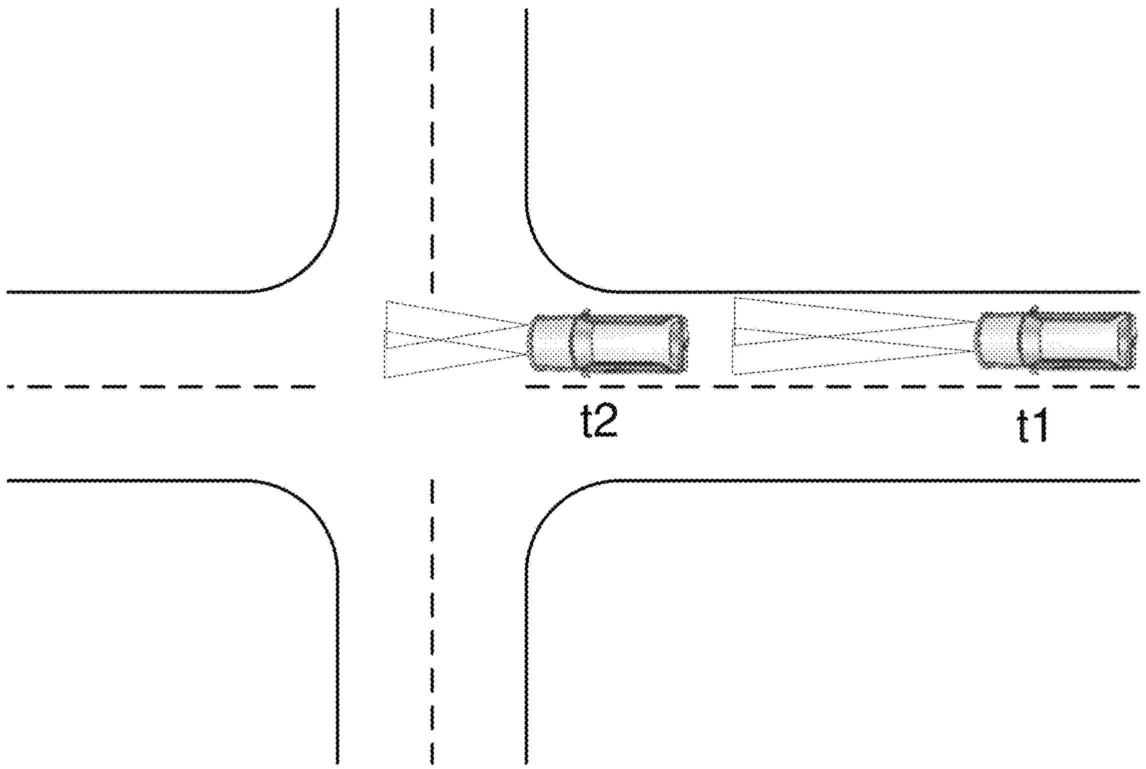
FIG. 9 is a schematic diagram illustrating the operation of a second alternate version of a vehicle with a headlight with a steerable beam according to the principles of a second embodiment of this disclosure.

In a second alternate version of the second embodiment the headlight 104 further comprises a controller 30 including at least one microprocessor 32 which are collectively programmed to receive speed data from the vehicle 102 via input 34 and operate the multi-stage, bi-axial liquid crystal polarization gratings 28 via outputs 36 to change the location that the laser light from high intensity laser sources 26 impinge on the phosphor converter 22 with a change in the speed of the vehicle 102 to change the direction of the beam B in a predetermined manner with a change in speed of the vehicle. For example, the direction of the beam B might be elevated with an increase in speed of the vehicle 102 (to illuminate further down the roadway), and lowered with a decrease in speed of the vehicle 102 (to better illuminate the roadway closer to the vehicle) so that an appropriate portion of the roadway ahead of the vehicle is illuminated for a given speed of the vehicle. This is illustrated in FIG. 9, where at t1, vehicle 102 is driving at a relatively fast speed, and the beams B of headlights 104 are directed more upwardly to project further down the roadway to provide adequate visualization for the speed. At t2, the vehicle 102 has slowed to pass through an intersection, and the beams B of the headlights 104 are adjusted more downwardly to project less far down the roadway, and better illuminate the space immediately in front of the vehicle.

Figure 10:
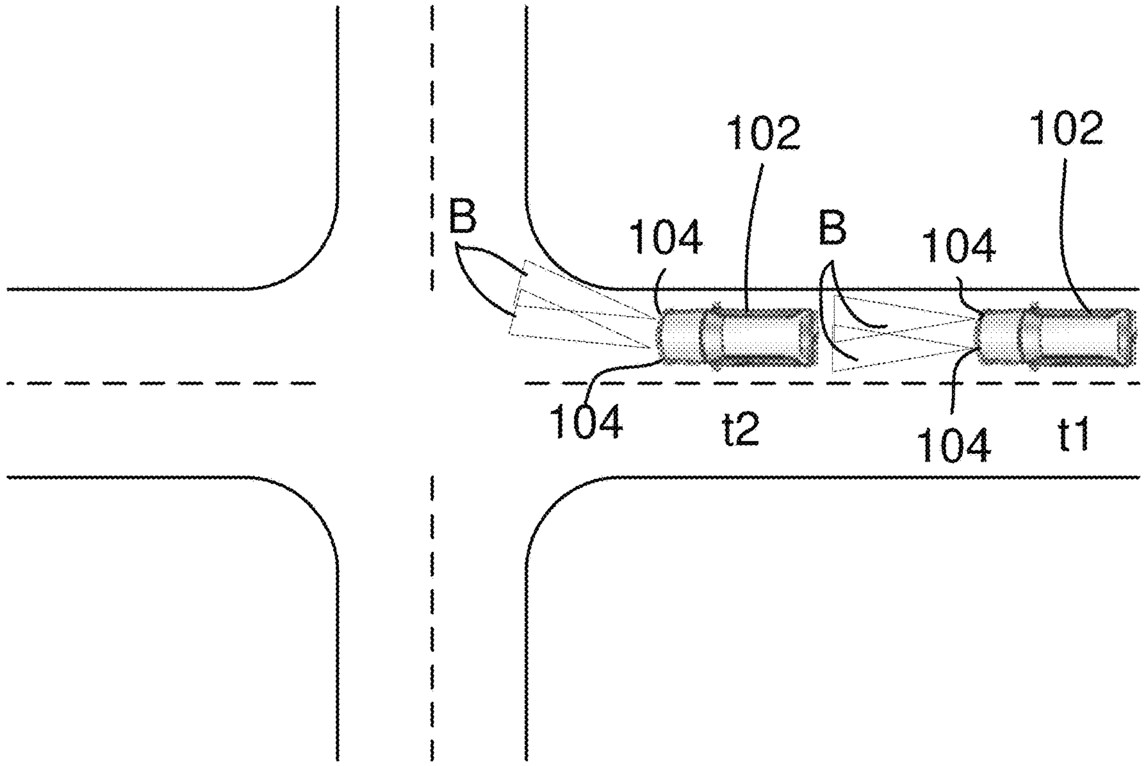
FIG. 10 is a schematic diagram illustrating the operation of a third alternate version of a vehicle with a headlight with a steerable beam according to the principles of a second embodiment of this disclosure.

In a third alternate version of the second embodiment the headlight 104 further comprises a controller 30 with an input 34 and outputs 36, and including at least one microprocessor 32 which are collectively programmed to receive turn signal data from the vehicle on input 34 and operate the multi-stage, bi-axial liquid crystal polarization gratings 28 via outputs 36 to change the location that the laser light from the high intensity lasers 26 impinge on the phosphor converter 22 upon operation of the vehicle turn signals to change the direction of all or a portion of the beam B in a predetermined manner, for example turning in the direction of the signaled turn to provide better visualization of the direction in which the vehicle 102 is about to head. This is illustrated in FIG. 10. 7 where at t1, vehicle 102 is heading straight, approaching an intersection, and the beams B of the headlights 104 project forwardly. At t2, the operator of vehicle 102 has turned on the right turn signal, and the headlights 104 change the direction of the beams B to the right, to illuminate the operator's intended direction of travel.

Figure 11:
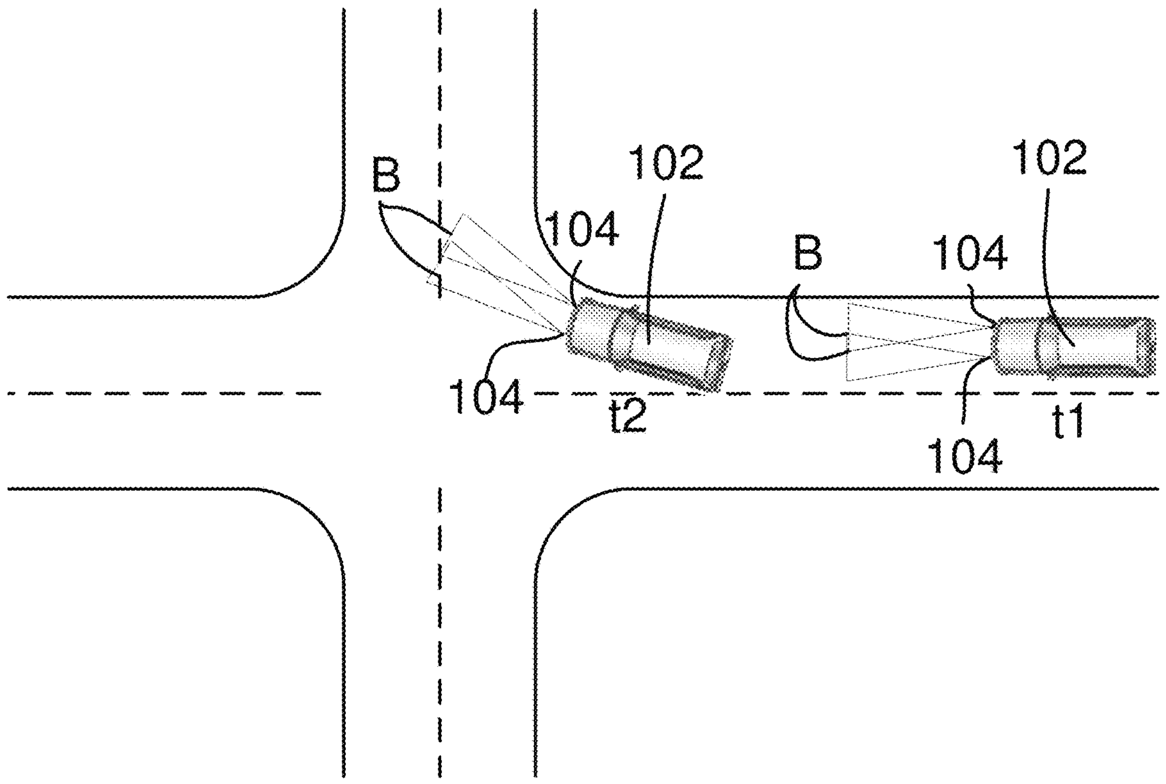
FIG. 11 is a schematic diagram illustrating the operation of a fourth alternate version of a vehicle with a headlight with a steerable beam according to the principles of a second embodiment of this disclosure.

In a fourth alternate version of the second embodiment the headlight 104 further comprises a controller 30 with an input 34 and outputs 36 including at least one microprocessor 32 which are collectively programmed to receive turning data (for example from the vehicle steering system or from GPS data) via input 34 and operate the multi-stage, bi-axial liquid crystal polarization gratings 28 via outputs 36 to change the location that the laser light impinges on the phosphor converter upon turning of the vehicle to change the direction of the beam in a predetermined manner, for example turning in the direction of the turn to provide better visualization of the direction in which the vehicle 102 is heading. This is illustrated in FIG. 11 where at t1, vehicle 102 is heading straight, approaching an intersection, and the beams B of the headlights 104 project forwardly. At t2, the operator of vehicle 102 has initiated a right turn, and the headlights 104 change the direction of the beams B or a portion of the beams B to the right, to illuminate the operator's direction of travel.

Figure 12:
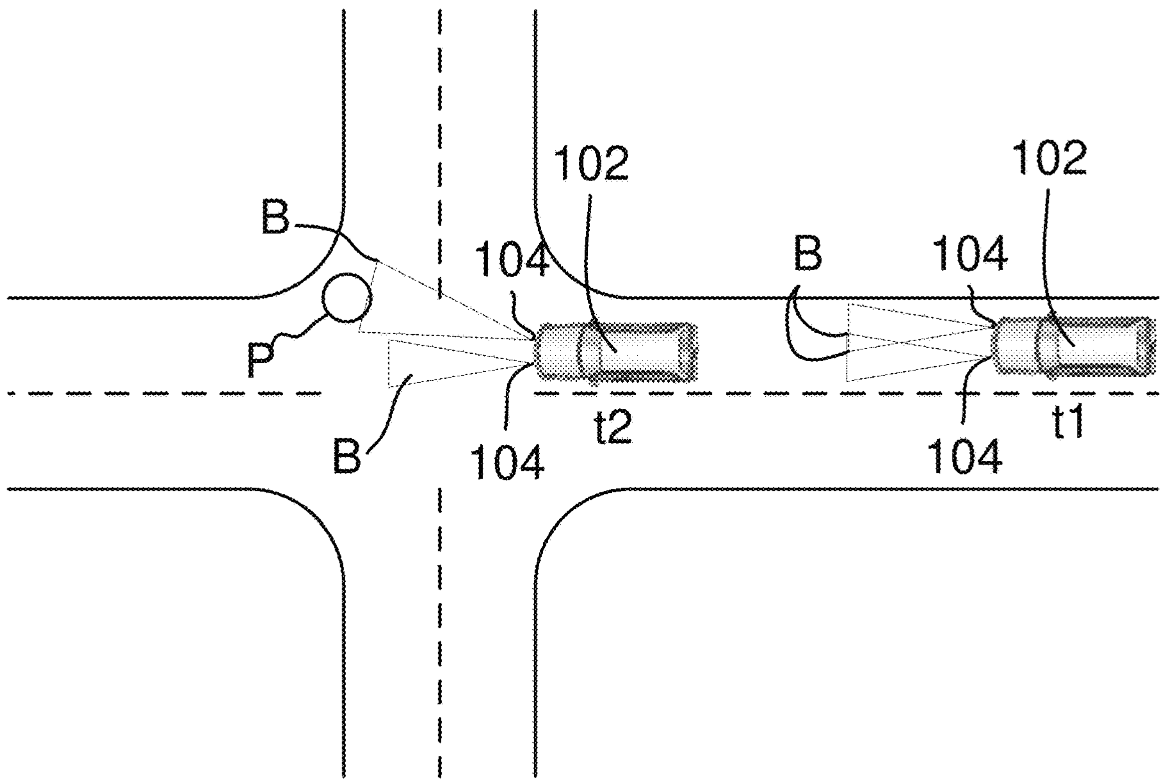
FIG. 12 is a schematic diagram illustrating the operation of a fifth alternate version of a vehicle with a headlight with a steerable beam according to the principles of a second embodiment of this disclosure.

In a fifth alternate version of the second embodiment the vehicle 102 has at least one of a lidar, radar, infrared, or optical imaging system 106, and the headlight 104 further comprises a controller 30, having an input 34 and outputs 36 including at least one microprocessor 32 which are collectively programmed 32 to receive data from the imaging system of the vehicle and operate the multi-stage, bi-axial liquid crystal polarization gratings 28 change the location that the laser light from high intensity laser sources 26 impinge on the phosphor converter 22 to change the direction of the beam B, or a portion of the beam B, in a predetermined manner. For example, as shown in FIG. 12, at t1 the vehicle 102 is approaching the intersection and the beams B from its headlights 104 are in their normal configuration. At time t2, an imaging system 106 detects a possible pedestrian P (or other object of potential interest) as the vehicle 102 enters the intersection, and at least one of the headlights 104 responds changing the shape and/or direction of the beam B or a portion of the beam B to illuminate the possible pedestrian P.

If there are multiple headlights 104, as is common, the controllers 30 of each of the headlights 104 can either be connected to coordinate a response of their respective headlights or there can be a single controller for all of the headlights.

In this second embodiment, and each of its versions, the at least one high intensity laser 26 is of a blue or a purple with a wavelength between about 400 and about 500 nanometers, and optionally between about 400 and about 450 nm. Similarly, in this second embodiment, and each of its versions, the at least one high intensity laser can be pulsed, to reduce the heating of the high intensity laser sources, and of the phosphor converter.

In this second embodiment, and each of its versions, the headlight 104 can include at least one high intensity laser 26 without a corresponding multi-stage, bi-axial liquid crystal polarization grating 28, in addition to at least one high intensity laser with a multi-stage, bi-axial liquid crystal polarization grating. This allows the beam B to have a fixed component generated by the high intensity laser 26 without a corresponding multi-stage, bi-axial liquid crystal polarization grating, and one or more steerable components that can respond to various situations encountered, such as increasing the intensity of the beam B, responding to a change in speed of the vehicle, responding to a turn signal, or actual turn of the vehicle, or responding to a potential obstacle detected by an imaging system on the vehicle generated by the high intensity lasers 26 with a corresponding multi-stage, bi-axial liquid crystal polarization grating 28.

According to a third embodiment of this disclosure, a method of changing the direction of the beam or a portion of a beam of a headlight on a vehicle having at least one high intensity laser source 26, a phosphor converter 22 that emits white light from a location impinged by light from the laser source, and at least one projection lens 24 for transmitting the white light emitted from the phosphor converter as a beam in a direction dependent on the location of emission from the phosphor converter, is provided. The method comprises operating a multi-stage, bi-axial liquid crystal polarization grating 28 to change the location where the light from the at least one high intensity laser source 26 impinges on the phosphor converter to thereby change the direction of the beam or a portion of a bema that is emitted through the at least one projection lens.

According to one version of the third embodiment, the laser source can be pulsed to reduce the heat generated by the at least one high intensity laser source, and the heat applied to the phosphor converter. According to another version of the third embodiment, the multi-stage, bi-axial liquid crystal polarization grating to change the location where the laser impinges on the phosphor converter to thereby change the direction of the beam or a portion of the beam, in response to changes in speed and/or direction of the vehicle.

The foregoing description is merely illustrative in nature and is in no way intended to limit the disclosure, its application, or uses. The broad teachings of this disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

What is claimed is:

1. A lamp with a steerable beam, comprising:
- a phosphor converter that emits white light from a location impinged by light from a laser;
- at least one projection lens forward of the phosphor converter for transmitting the white light emitted from the phosphor converter in as a beam in a direction dependent on the location of emission from the phosphor converter;
- at least one high intensity laser directed generally rearwardly toward the phosphor converter; and
- at least one multi-stage, bi-axial liquid crystal polarization grating for directing laser light from the at least one high intensity laser to a selectable location on the phosphor converter.

2. The lamp with a steerable beam according to claim 1 wherein the at least one high intensity laser is of a blue or a purple wavelength.

3. The lamp with steerable beam according to claim 1 wherein the at least one high intensity laser is a pulsed laser that creates a pulsed emission from the phosphor converter, resulting in a pulsed beam.

4. The lamp with steerable beam according to claim 1 comprising at least one high intensity laser without a corresponding multi-stage, bi-axial liquid crystal polarization grating, directed to a fixed location on the phosphor converter and at least one high intensity laser with a multi-stage, bi-axial liquid crystal polarization grating.

5. The lamp with a steerable beam according to claim 1, wherein there are a plurality of high intensity lasers, and a multi-stage, bi-axial liquid crystal polarization grating for each high intensity laser for directing light from its respective high intensity laser to a selectable location on the phosphor converter.

6. The lamp with a steerable beam according to claim 1, further comprising a controller including at least one microprocessor programmed to receive location data and operate the multi-stage, bi-axial liquid crystal polarization grating to direct the beam in a direction toward the location corresponding to the location data.

7. The lamp with a steerable beam according to claim 1, wherein there are, a plurality of high intensity lasers, and a multi-stage, bi-axial liquid crystal polarization grating for each high intensity laser for directing light from its respective high intensity laser to a selectable location on the phosphor converter, and further comprising a controller including at least one microprocessor programmed to selectively operate the multi-stage, bi-axial liquid crystal polarization grating to direct the beams of at least two of the high intensity lasers to the same location on the phosphor converter.

8. In combination with a vehicle, a headlight with a steerable beam, comprising:
- a phosphor converter that emits white light from a location impinged by light from a laser;
- at least one projection lens forward of the phosphor converter for transmitting the white light emitted from the phosphor converter in as a beam in a direction dependent on the location of emission from the phosphor converter;
- at least one high intensity laser directed generally rearwardly toward the phosphor converter; and
- at least one multi-stage, bi-axial liquid crystal polarization grating for directing laser light from the at least one high intensity laser to a selectable location on the phosphor converter.

9. The combination according to claim 8, wherein the headlight further comprises a controller including at least one microprocessor programmed to receive location data and operate the multi-stage, bi-axial liquid crystal polarization grating to direct the laser light to a location on phosphor converter that will create a beam in a direction toward the location corresponding to the location data.

10. The combination according to claim 8, wherein the headlight comprises a plurality of high intensity lasers, and a multi-stage, bi-axial liquid crystal polarization grating for each high intensity laser for directing light from its respective high intensity laser to a selectable location on the phosphor converter, and further comprising a controller including at least one microprocessor programmed to selectively operate the multi-stage, bi-axial liquid crystal polarization gratings to direct the beams of at least two of the high intensity lasers to the same location on the phosphor converter.

11. The combination according to claim 8, wherein the headlight further comprises a controller including at least one microprocessor programmed to receive speed data and operate the multi-stage, bi-axial liquid crystal polarization grating change the location that the laser light impinges on the phosphor converter with a change in speed to change the direction of the beam in a predetermined manner with a change in speed.

12. The combination according to claim 8, wherein the headlight further comprises a controller including at least one microprocessor programmed to receive turn signal data and operate the multi-stage, bi-axial liquid crystal polarization grating change the location that the laser light impinges on the phosphor converter upon operation of the vehicle turn signal to change the direction of the beam in a predetermined manner.

13. The combination according to claim 8, wherein the headlight further comprises a controller including at least one microprocessor programmed to receive turning data and operate the multi-stage, bi-axial liquid crystal polarization grating change the location that the laser light impinges on the phosphor converter upon turning of the vehicle to change the direction of the beam in a predetermined manner.

14. The combination according to claim 8, wherein the vehicle has at least one of a lidar, radar, ultrasound, or optical imaging system, and wherein the headlight further comprises a controller including at least one microprocessor programmed to receive data from the imaging system and operate the multi-stage, bi-axial liquid crystal polarization grating change the location that the laser light impinges on the phosphor converter to change the direction of the beam in a predetermined manner.

15. The combination according to claim 8 wherein the at least one high intensity laser is of a blue or a purple wavelength, between about 400 nm and about 450 nm.

16. The combination according to claim 8 wherein the at least one high intensity laser is a pulsed laser that creates a pulsed emission from the phosphor converter, resulting in a pulsed beam.

17. The combination according to claim 8 wherein the headlight includes at least one high intensity laser without a corresponding multi-stage, bi-axial liquid crystal polarization grating, and at least one high intensity laser with a multi-stage, bi-axial liquid crystal polarization grating.

18. A method of changing the direction of the beam of a headlight on a vehicle having a high intensity laser source, a phosphor converter that emits white light from a location impinged by light from a laser positioned forward of the phosphor converter, and at least one projection lens in front of the phosphor converter for transmitting the white light emitted from the phosphor converter in as a beam in a direction dependent on the location of emission from the phosphor converter, the method comprising operating a multi-stage, bi-axial liquid crystal polarization grating to change the location where the laser impinges on the phosphor converter to thereby change the direction of the beam.

19. The method according to claim 18 further comprising the step of pulse modulating the laser source to produce a pulsating beam.

20. The method according to claim 18 comprising operating the multi-stage, bi-axial liquid crystal polarization grating to change the location where the laser impinges on the phosphor converter to thereby change the direction of the beam, in response to changes in speed or direction of the vehicle.

* * * * *